No. 842,972. PATENTED FEB. 5, 1907.
G. S. POWER.
ROCK DRILL SADDLE.
APPLICATION FILED MAR. 31, 1906.
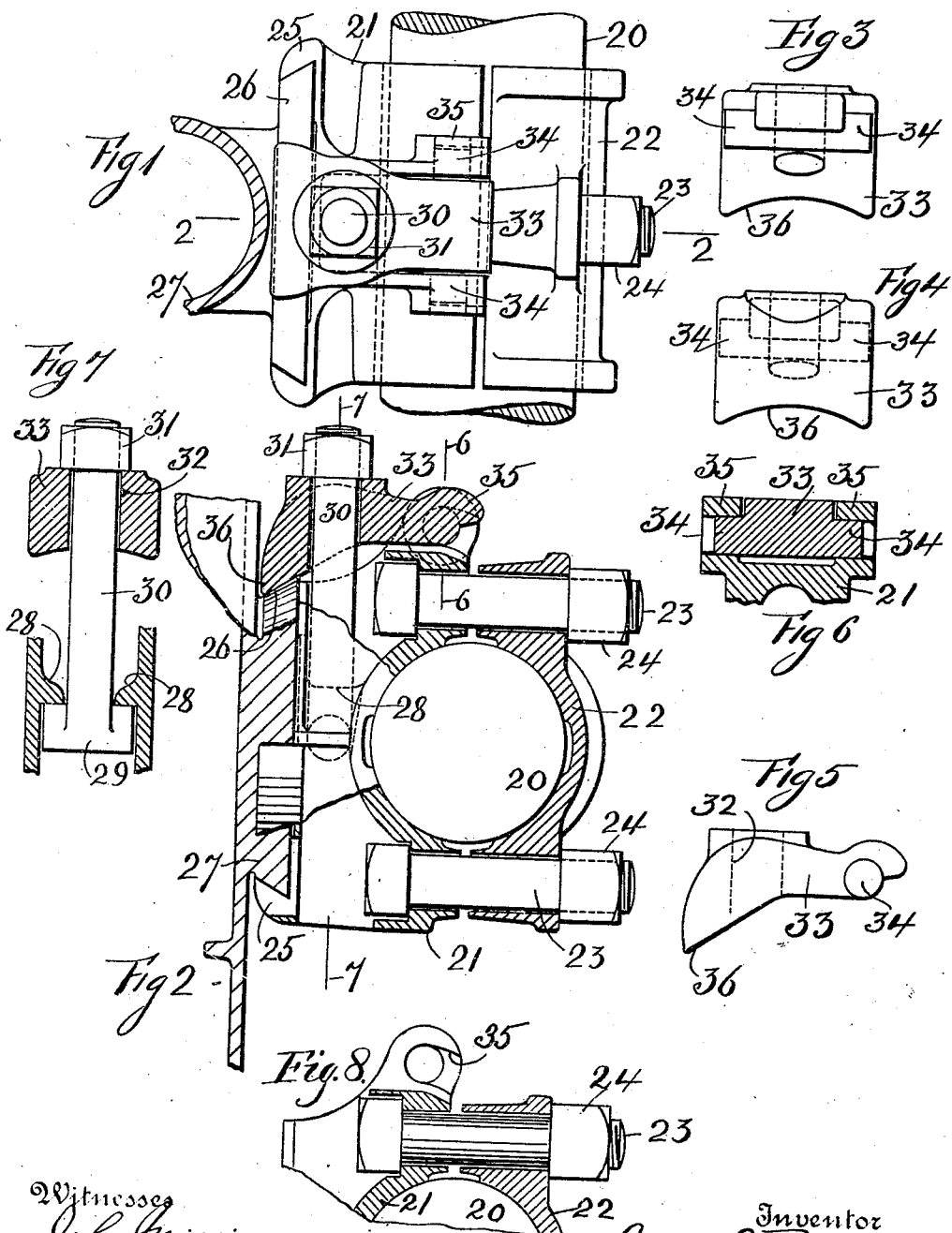
Witnesses
Inventor
George S. Power
By his Attorney

UNITED STATES PATENT OFFICE.

GEORGE S. POWER, OF PASSAIC, NEW JERSEY.

ROCK-DRILL SADDLE.

No. 842,972.   Specification of Letters Patent.   Patented Feb. 5, 1907.

Application filed March 31, 1906. Serial No. 309,082.

*To all whom it may concern:*

Be it known that I, GEORGE S. POWER, a citizen of the United States, and a resident of Passaic, in the county of Passaic and State of New Jersey, have invented certain new and useful Improvements in Rock-Drill Saddles, of which the following is a specification.

This invention relates to rock-drill saddles, which may be formed with the body portion of a tripod or secured to an upright column or an arm projecting therefrom. Its novelty comprises specifically an improved removable clamping-jaw, which latter is carried on the saddle and by means of which a drill-back is easily clamped in various positions.

The invention is exemplified in the accompanying drawings with the saddle designed for an arm projecting from a column, the latter not being shown.

Figure 1 shows a top plan view of the saddle and a portion of a drill-back. Fig. 2 shows a partial front view and section of Fig. 1 on the line 2 2. Fig. 3 is a right-hand end view of the removable clamping-jaw of the saddle. Fig. 4 is a left-hand end view of the clamping-jaw. Fig. 5 represents a side view of the said clamping-jaw. Fig. 6 shows a partial section of Fig. 2 on the line 6 6. Fig. 7 is a partial section of Fig. 2 on the line 7 7. Fig. 8 shows a partial section of Fig. 1 on the line 2 2 with the clamping-jaw removed.

An arm 20 has clamped thereto the body portion 21 of a saddle by means of the cap 22 and bolts 23 with the nuts 24. The portion 21 has formed therewith in the usual manner a dovetailed semicircular flange 25, in which is supported a conical projection 26 of a drill-back 27.

Under a pair of lugs 28 extending from the body portion 21 of the saddles is supported a cross-bar 29 of a swinging bolt 30, which carries the nut 31. The bolt passes through an opening 32 in the removable clamping-jaw 33.

The jaw 33 has formed therewith at its front end the toe 36 and has extending from its sides adjacent to its back end the pivots 34. The said pivots engage with the elongated bearings 35, that extend from the upper end of the body portion 21 of the saddle. The said bearings extend and are opened to the rear of the pivots 34.

To use the invention, the saddle is clamped in place by tightening the nuts 24 on the bolts 23, which hold the body portion 21 and cap 22 on the arm 20. Then the conical projection 26 of the drill-back is placed in the proper operative position on the dovetailed flange 25. Next the removable clamping-jaw 33 is located in position by engaging the pivots 34 with the elongated and open bearings 35. The bolt 30 being in place, the nut 31 is screwed down, by virtue of which the toe 36 of the removable clamping-jaw 33 bears on the conical projection 26 of the drill-back.

Should it be desired to disengage the projection 26 of the drill-back from the dovetailed flange 25, the nut 31 is unscrewed and the clamping-jaw 33 disengaged from the elongated bearings 35 by backing the pivots 34 out of the same. This operation avoids swinging the clamping-jaw 33 on the pivots 34 and avoids the necessity of the toe 36 of the jaw swinging and interfering with the rock-drill back 27 when being disconnected.

It will be noted that when the pivots of the clamping-jaw 33 are backed out of the elongated bearings 35 that the bolt 30 swings on its cross-bar 29 under the lugs 28.

Having described my invention, I claim—

1. In a saddle for supporting a drill the combination of a removable clamping-jaw, pivots extending from the sides of the jaw, elongated bearings formed in the saddle extending and opened to the rear of said pivots, and a bolt connecting the said saddle and clamping-jaw.

2. In a saddle for supporting a drill the combination of a body portion therefor, a cap bolted to the body portion, a dovetailed flange extending from the body portion, a pair of lugs in the body portion, a bolt, a cross-bar extending from the bolt and engaging with said lugs, a removable clamping-jaw engaged with said bolt, pivots extending from the sides of the jaw, and elongated bearings formed in the saddle extending and opened to the rear of said pivots.

3. The combination of a drill, a saddle for supporting the same, a conical projection extending from the drill, a dovetailed flange extending from the saddle engaging the said conical projection, a removable clamping-jaw bearing on the said conical projection, pivots extending from the sides of the jaw, elongated bearings formed in the saddle extending and opened to the rear of said pivots, and a swinging bolt extending from the saddle and engaging the clamping-jaw.

4. The combination of a drill-back, a projection extending therefrom, a saddle for supporting the drill-back, a flange extending from the saddle engaging the said projection of the drill-back, lugs on the saddle, a swinging bolt bearing up against said lugs, a clamping-jaw engaged with said bolt, a toe on said jaw bearing on the projection of the drill-back, pivots extending from the sides of the jaw, elongated bearings formed in the saddle extending and opened to the rear of said pivots.

Signed at New York, in the county of New York and State of New York, this 26th day of March, A. D. 1906.

GEORGE S. POWER.

Witnesses:
    MYRON H. COOK,
    JOHN J. MILLIN.